(12) United States Patent
Kambegawa

(10) Patent No.: US 6,882,751 B2
(45) Date of Patent: Apr. 19, 2005

(54) ARITHMETIC DECODING METHOD AND DEVICE AND STORAGE MEDIUM

(75) Inventor: Minoru Kambegawa, Kanagawa (JP)

(73) Assignee: Canon Kabushiki Kaisha (JP)

( * ) Notice: Subject to any disclaimer, the term of this patent is extended or adjusted under 35 U.S.C. 154(b) by 568 days.

(21) Appl. No.: 09/881,196

(22) Filed: Jun. 14, 2001

(65) Prior Publication Data
US 2002/0102030 A1 Aug. 1, 2002

(30) Foreign Application Priority Data
Jun. 14, 2000 (JP) .................................. 2000-178704

(51) Int. Cl.[7] .................................................. G06K 9/36
(52) U.S. Cl. ................................. 382/247; 382/233
(58) Field of Search ............................. 382/232–233, 382/244, 246–247, 305; 341/107

(56) References Cited

U.S. PATENT DOCUMENTS 5,442,458 A * 8/1995 Rabbani et al. ............. 382/247
5,809,176 A * 9/1998 Yajima ....................... 382/247
6,055,338 A * 4/2000 Endo et al. .................. 382/247
6,118,900 A * 9/2000 Yokose et al. .............. 382/234
6,625,321 B1 * 9/2003 Li et al. ...................... 382/239

OTHER PUBLICATIONS

Sodagar, et al. "A New Error Resilience Technique for Image Compression Using Arithmetic Coding", IEEE, pp. 2127–2130, Apr. 2000.*

* cited by examiner

Primary Examiner—Daniel Mariam
(74) Attorney, Agent, or Firm—Rossi, Kimms & McDowell (57) ABSTRACT

An arithmetic decoding method and apparatus process both binary image data and multi-level image data. When 4-bit image data is decoded, four complete sets of pairs of a more probable symbol and a state value or a probability estimate corresponding to pixels of four bitplanes are stored in corresponding ones of four predicted state memories. When less than 4-bit image data is to be decoded, a complete set of pairs of the more probable symbol and state value or the probability estimate corresponding to pixels of each bitplane are allocated to and stored in at least part of the four state memories. Ones of the pairs of the more probable symbol and the state value or the probability estimate are sequentially read from the four state memories and are used to sequentially decode the pixels.

13 Claims, 6 Drawing Sheets

ARITHMETIC DECODING METHOD AND DEVICE AND STORAGE MEDIUM

BACKGROUND OF THE INVENTION

1. Field of the Invention

This invention relates to an arithmetic decoding method and device for decoding encoded image data formed by arithmetic coding, and more particularly to an arithmetic decoding method and device which are capable of processing not only bi-level (binary) images but also multi-level images, and a storage medium storing a program for executing the arithmetic decoding method.

2. Prior Art

In arithmetic coding, an interval on a number line [0, 1] where the square bracket on the interval end denotes equality being allowed and the curved bracket denotes it being disallowed is divided into sub-intervals according to probabilities of occurrence of symbols such that the sub-intervals have lengths corresponding to the probabilities of the symbols, respectively, and one of the sub-intervals corresponding to a symbol to be encoded is selected for encoding thereof. Then, the selected sub-interval is recursively subdivided into smaller sub-intervals according to the probabilities and one of the smaller sub-intervals corresponding to a symbol to be encoded next is selected for the encoding thereof. This recursive subdivision and selection of a sub-interval is repeatedly carried out for a whole sequence of symbols to be encoded, and coordinates of a point within a final sub-interval thus obtained is represented by a binary fraction which is at least distinguishable from those contained in the other sub-intervals so as to use the binary fraction as a code of the whole sequence of the symbols.

Typical arithmetic coding methods include the JBIG method (QM-coder) standardized by an organization called JBIG (Joint Bi-level Image Experts Group) which belongs to the ITU (International Telecommunications Union), and the Q-coder proposed by the IBM.

These methods use similar but different terminologies, and for the consistency of description of the present invention, in the following, the JBIG standard terminology will be used.

According to the basic theory of arithmetic coding, it is necessary for an arithmetic operation section of an encoder to carry out multiplications. This leads to a larger size of hardware of the arithmetic operation section and longer processing times for the multiplications. To eliminate these inconveniences, it is a mainstream method to use additions and subtractions in place of the multiplications, for simplified arithmetic operations.

The arithmetic operation section is comprised of an A register for holding the width or size (augend) of the current coding interval corresponding to an encoded sequence of symbols, and a code register (C register) for holding a value based on which an arithmetic code is generated. Assuming that a value corresponding to a probability that a more probable symbol (MPS) does not agree with a symbol to be encoded is defined as a probability estimate (LSZ), the arithmetic operation section is supplied with the more probable symbol (MPS), the value of the symbol to be encoded, and the LSZ, as input data, and carries out arithmetic operations (addition and subtraction) between the probability estimate LSZ and the values stored i the two registers, depending on information as to whether the symbol to be encoded agrees with the MPS, to thereby update the values of the two registers.

The aforementioned subinterval width is reduced whenever the recursive division is carried out, and hence the value of the A register is normalized to maintain accuracy of the coding. The normalization is performed by bit shifting of the A register and the C register to the left. Determined high-order bits of the C register are outputted as an arithmetic code.

When the encoded data is decoded, an arithmetic operation section of a decoder is supplied with an MPS, an LSZ, and an arithmetic code. Since it is possible to determine from the values of the LSZ and the arithmetic code whether or not the MPS and a symbol to be decoded agree with each other, the value of the symbol to be decoded can be calculated back.

The MPS and the LSZ are determined from information called a CX (context). The CX is comprised of nearby symbol values already generated when a symbol to be encoded is processed. In the JBIG method, a CX is composed of ten symbol values, which means that the CX can assume 1024 different values, and each CX having a different value has an MPS and a state value (ST) indicative of a probability. The LSZ is obtained by converting the state value of the CX with reference to a predetermined lookup table.

The MPS and ST of each context (CX) are updated under a specific condition, which makes it possible to learn a pattern peculiar to a sequence of symbols to be encoded, thereby enhancing decoding efficiency. More specifically, each pair of MPS and ST are set as data in a corresponding one of ten-bit addresses of a RAM (Random Access Memory) which are associated with possible values of the CX, and outputted from the RAM when the RAM is addressed by the CX. The MPS and ST in each address of the RAM are updated by rewriting the data thereof stored in the address.

In the arithmetic coding method, a symbol to be encoded and the MPS are binary, and hence the JBIG defines only the method for processing binary images. However, also in processing a multi-level image, it is possible to extract data on a bit-by-bit basis and subject the same to arithmetic operation. In this case, although the operation of the arithmetic operation section is not influenced by a difference between a binary image and a multi-level image, the manner of deriving the LSZ has to be considered deliberately, because the correlation in probability of occurrence between a symbol group (context) preceding a symbol to be encoded and the symbol to be encoded varies depending upon a bitplane to which the symbol to be encoded belongs. In short, a context paired with an LSZ is required to be set independently for each bitplane.

Another problem with the prior art is concerned with the speedup of decoding. From the principles of arithmetic coding, the closer the correlation between a context and a pixel being encoded, the higher the compression efficiency is. Further, pixels corresponding to the respective symbols of the context are required to have already been processed, so that e.g. in processing a 1-bit image, a symbol for a pixel immediately preceding the pixel being encoded is one of the components of the context. This imposes constraints on the speedup of processing for decoding by arithmetic operations, because the context cannot be identified until the value of the immediately preceding pixel is determined, and hence readout of the corresponding state value cannot be started.

As a solution to this problem, there has been proposed a method in which the RAM storing MPS's and ST's is divided into a plurality of RAM's so as to enable the possible state values to be read out beforehand. According to this solution, for example, when the value of the second preceding pixel is determined, the possibilities of the whole context are limited to two, one having a value of 0 for the immediately preceding pixel and the other having a value of 0 for the same, and therefore, at this time point, the data are simultaneously read from the two the RAM's, thereby allowing one of the two state values corresponding to the two context values to be selected at a time point the value of the immediately preceding pixel is determined.

In the above prior art, it is required to divide the memory in both of a case where the optimum arithmetic coding is carried out on a multi-level image and a case where high-speed decoding is carried out on a binary image. Further, even when an arithmetic decoding device capable of processing not only binary images but also multi-level images can have an arithmetic operation section commonly usable for processing the two kinds of images, memories for storing state values cannot be replaced by a common memory, which results in an increase in the manufacturing cost of the device.

SUMMARY OF THE INVENTION

It is an object of the invention to provide an inexpensive arithmetic decoding method and device that can process both of binary image data and multi-level image data, and a storage medium storing a program for executing the arithmetic decoding method.

To attain the above object, in a first aspect of the present invention, there is provided an arithmetic decoding method of decoding arithmetically encoded image data formed of at least one bitplane, by using n memories that can be accessed separately, the arithmetic decoding method according to the first aspect comprising the steps of storing, when n-bit image data is to be decoded, n variables corresponding to pixels to be decoded, of respective n bitplanes of the n-bit image data in respective corresponding ones of the n memories, storing, when less than n-bit image data is to be decoded, one of the variables corresponding to pixels to be decoded, of each bitplane of the less than n-bit image data, in at least part of the n memories by allocating the one of the variables thereto, sequentially reading ones of the variables corresponding, respectively, to pixels to be decoded, of each bitplane, from the n memories, and sequentially decoding the pixels based on the corresponding ones of the variables sequentially read from the n memories.

To attain the above object, in a second aspect of the present invention, there is provided a arithmetic decoding method of decoding arithmetically encoded image data formed of at least one bitplane, by using n memories that can be accessed separately, the arithmetic decoding method comprising the steps of storing, when n-bit image data is to be decoded, n sets of a more probable symbol and a state value or a probability estimate corresponding to pixels to be decoded, of respective n bitplanes of the n-bit image data in respective corresponding ones of the n memories, storing, when less than n-bit image data is to be decoded, a set of the more probable symbol and the state value or the probability estimate corresponding to pixels to be decoded, of each bitplane of the less than n-bit image data, in at least part of the n memories by allocating the set of the more probable symbol and the state value or the probability estimate thereto, sequentially reading pairs of the more probable symbol and the state value or the probability estimate corresponding, respectively, to pixels to be decoded, of each bitplane from the n memories, and sequentially decoding the pixels based on the corresponding pairs of the more probable symbol and the state value or the probability estimate sequentially read from the n memories.

Preferably, the arithmetic decoding method according to the second aspect includes the steps of reading b pairs of the more probable symbol and the state value or the probability estimate that can actually correspond to each pixel simultaneously from the n memories, before which of the b pairs of the more probable symbol and the state value or the probability estimate actually corresponds to the pixel is known, when the relationship of n=m×b (m is equal to the less than n, and b is an integer equal to or larger than 2) holds, excluding ones of the b pairs of the more probable symbol and the state value or the probability estimate which are known not to correspond to the pixels and carrying out the decoding by selecting and using one of the b pairs of the more probable symbol and the state value or the probability estimate which is eventually known to actually correspond to the pixel.

Preferably, the arithmetic decoding method according to the second aspect includes the step of designating a mode of the decoding corresponding to the number of bits of the image data.

Also preferably, the arithmetic decoding method according to the second aspect includes the step of generating a context for selecting the one of the b pairs of the more probable symbol and the state value or the probability estimate, in a manner such that one of components of the context, which is to be determined last, is set to a bit representative of a pixel on a most significant one of the at least one bitplane.

To attain the above object, in a third aspect of the present invention, there is provided an arithmetic decoding device for decoding arithmetically encoded image data formed of at least one bitplane, the arithmetic decoding device comprising n memories that can be accessed separately and stores n sets of a more probable symbol and a state value or a probability estimate for decoding pixels of the at least one bitplane, a storage control section that stores, when n-bit image data is to be decoded, the n sets of the more probable symbol and the state value or the probability estimate corresponding to pixels to be decoded, of respective n bitplanes of the n-bit image data in respective corresponding ones of the n memories, and stores, when less than n-bit image data is to be decoded, a set of the more probable symbol and the state value or the probability estimate corresponding to pixels to be decoded, of each bitplane of the less than n-bit image data, in at least part of the n memories by allocating the set of the more probable symbol and the state value or the probability estimate thereto, a readout section that sequentially reads pairs of the more probable symbol and the state value or the probability estimate corresponding, respectively, to pixels to be decoded, of each bitplane from the n memories, and a decoding section that sequentially decodes the pixels based on the corresponding pairs of the more probable symbol and the state value or the probability estimate sequentially read from the n memories.

Preferably, the arithmetic decoding device according to the third aspect includes a pre-read control section that reads b pairs of the more probable symbol and the state value or the probability estimate that can actually correspond to each pixel simultaneously from the n memories, before which of the b pairs of the more probable symbol and the state value or the probability estimate actually corresponds to the pixel is known, when the relationship of n=m×b (m is equal to the less than n, and b is an integer equal to or larger than 2) holds, and a selection section that excludes ones of the b pairs of the more probable symbol and the state value or the probability estimate which are known not to correspond to the pixels and wherein the decoding section carries out the decoding by selecting and using one of the b pairs of the more probable symbol and the state value or the probability estimate which is eventually known to actually correspond to the pixel.

Preferably, the arithmetic decoding device according to the third aspect includes a decoding mode-designating section that designates a mode of the decoding corresponding to the number of bits of the image data.

Also preferably, the arithmetic decoding device according to the third aspect includes a context-generating section that generates a context for selecting the one of the b pairs of the more probable symbol and the state value or the probability estimate, in a manner such that one of components of the context, which is to be determined last, is set to a bit representative of a pixel on a most significant one of the at least one bitplane.

To attain the above object, in a fourth aspect of the present invention, there is provided a storage medium storing a program for causing a computer to execute an arithmetic decoding method of decoding arithmetically encoded image data formed of at least one bitplane, by n memories that can be accessed separately, the program comprising a storage control module that stores, when n-bit image data is to be decoded, n sets of a more probable symbol and a state value or a probability estimate corresponding to pixels to be decoded, of respective n bitplanes of the n-bit image data in respective corresponding ones of the n memories, and stores, when less than n-bit image data is to be decoded, a set of the more probable symbol and the state value or the probability estimate corresponding to pixels to be decoded, of each bitplane of the less than n-bit image data, in at least part of the n memories by allocating the set of the more probable symbol and the state value or the probability estimate thereto, a readout module that sequentially reads pairs of the more probable symbol and the state value or the probability estimate corresponding, respectively, to pixels to be decoded of each bitplane from the n memories, and a decoding module that sequentially decodes the pixels based on the corresponding pairs of the more probable symbol and the state value or the probability estimate sequentially read from the n memories.

The above and other objects of the invention will become more apparent from the following detailed description taken in conjunction with the accompanying drawings.

BRIEF DESCRIPTION OF THE DRAWING

FIGS. 3A to 3D are diagrams useful in explaining how to determine a CX for processing image data having 4-bit depth by the FIG. 1 arithmetic decoding device, in which:

FIGS. 5A and 5B are diagrams useful in explaining how to determine a CX for processing image data having 2-bit depth by the FIG. 1 arithmetic decoding device, in which:

DETAILED DESCRIPTION OF PREFERRED EMBODIMENT

The present invention will now be described in detail with reference to the drawings showing an embodiment thereof.

Figure 1:
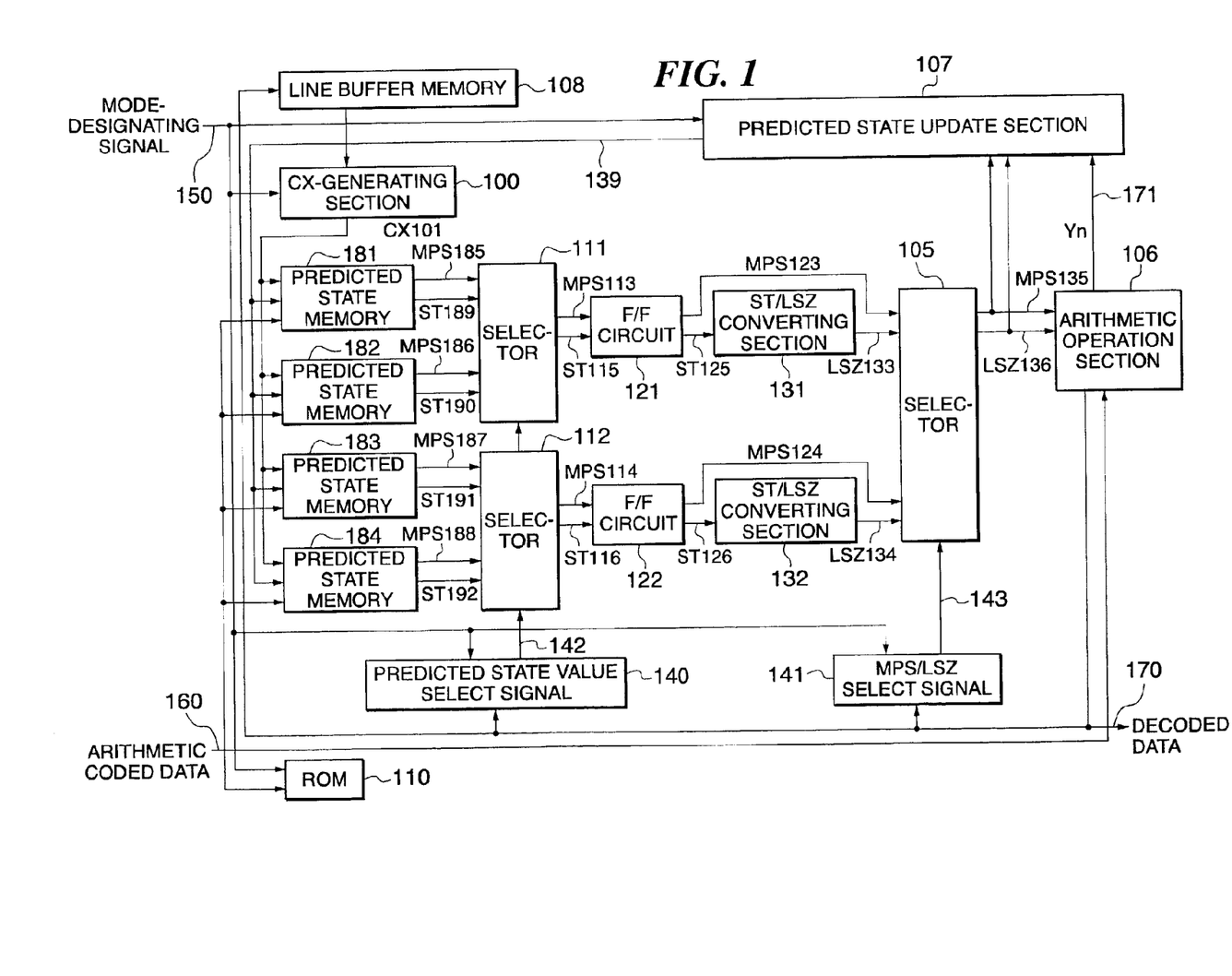
FIG. 1 is a block diagram showing the configuration of an arithmetic decoding device according to an embodiment of the present invention.

Referring first to FIG. 1, there is shown the configuration of an arithmetic decoding device according to an embodiment of the invention.

In the figure, reference numeral 160 designates arithmetic coded data to be decoded, and reference numeral 150 designates a mode-designating signal for designating any one of a 1-bit mode, a 2-bit mode and a 4-bit mode.

Reference numeral 108 designates a line buffer memory for buffering decoded image data in an amount corresponding to approximately one horizontal scanning line of the data. Reference numeral 100 designates a CX-generating section responsive to the mode-designating signal 150, for generating a CX (context) 101 from image data of the immediately preceding line and image data corresponding to several pixels on the same line which have already been decoded, and delivered from the line buffer 108.

Reference numeral 110 designates a ROM storing the whole data of pairs of MPS's (more probable symbols) and ST's (state values) for each bit mode.

Reference numerals 181 to 184 each designate a predicted state memory formed by a synchronous 2-port SRAM (Static Random Access Memory). The predicted state memories 181 to 184 each has 1024 addresses which correspond to respective maximum 1024 possible values of the CX 101 outputted from the CX-generating section 100. In response to the mode-designating signal 150 designating one of 1-bit, 2-bit, and 4 bit modes, a pair of an MPS (more probable symbol) and an ST (state value) are stored in each of the addresses according to the designated bit mode. Each pair of an MPS and an ST are updated by a predicted state update section 107, referred to hereinafter. The predicted state memories 181 to 184 are commonly supplied with the CX 101 generated in a manner dependent on the bit mode of the arithmetic decoding device, as will be described in detail hereinafter, for delivering respective MPS's (more probable symbols) 185 to 188 and respective ST's (state values) 189 to 192.

Reference numeral 140 designates a predicted state value select signal-generating section that generates a predicted state value select signal 142. Reference numeral 111 designates a first selector that selects either the MPS 185 and ST 189 delivered from the first predicted state memory 181 or the MPS 186 and ST 190 delivered from the second predicted state memory 182, and outputs the selected data. Reference numeral 112 designates a second selector that selects either the MPS 187 and ST 191 delivered from the third predicted state memory 183 or the MPS 188 and ST 192 delivered from the fourth predicted state memory 184, and outputs the selected data. The selectors 111, 112 perform their selections in response to the predicted state value select signal 142.

Reference numeral 121 designates a first F/F (flip-flop) circuit for holding the data (MPS 113, ST 115) delivered from the first selector 111, while reference numeral 122 designates a second F/F (flip-flop) circuit for holding the data (MPS 114, ST 116) delivered from the second selector 112. Further, reference numeral 131 designates a first ST/LSZ converting section for converting an ST 125 delivered from the first F/F circuit 121 to an LSZ (probability estimate) 133, while reference numeral 132 designates a second ST/LSZ converting section for converting an ST 126 delivered from the second F/F circuit 122 to an LSZ (probability estimate) 134.

Reference numeral 141 designates an MPS/LSZ select signal-generating section that generates an MPS/LSZ select signal 143. Reference numeral 105 designates a third selector that selects either a pair of the MPS 123 delivered from the first F/F circuit 121 and the LSZ 133 delivered from the first ST/LSZ converting section 131 or a pair of the MPS 124 from the second F/F circuit 122 and the LSZ 134 delivered from the second ST/LSZ converting section 132, and outputs the selected pair as an MPS 135 and an LSZ 136. The third selector 105 performs the selection in response to the MPS/LSZ select signal 143.

The arithmetic coded data 160 is supplied to an arithmetic operation section 106 as required. The arithmetic operation section 106 determines, based on the arithmetic coded data 160 and the LSZ 136 delivered from the third selector 105, whether or not a prediction performed during arithmetic coding was correct, and then outputs a Yn signal 171 indicative of the result of the determination. Further, the arithmetic operation section 106 outputs a value of decoded data 170 determined based on the MPS 135 delivered from the third selector 105 and the Yn signal 171.

The predicted state update section 107 updates the predicted state according to the output from the arithmetic operation section 106. More specifically, the predicted state update section 107 determines an updated pair 139 of a predicted state value, i.e. a state value ST and a more probably symbol MPS based on the MPS 135, the LSZ 136, and the Yn signal 171, and supplies the same to a corresponding address of the first to fourth predicted state memories 181 to 184.

The blocks shown in FIG. 1 basically function as described above.

Although in the present embodiment, the first to fourth predicted state memories 181 to 184 store more probable symbols (MPS's) and state values (ST's), this is not limitative but probability estimates (LSZ's) corresponding to the respective state values (ST's) may be stored in place of the state values (ST's). The use of probability estimates (LSZ's) for such a purpose is not a widely-employed practice because the probability estimate (LSZ) has a larger number of bits than the state value (ST), and a RAM having a larger storage capacity is required. When the probability estimates (LSZ's) are stored in place of the state values (ST's), however, it is possible to omit a process of determining a probability estimate (LSZ) from a state value (ST).

Next, a description will be given of operations for decoding binary image data.

(In 1-Bit Mode)

Figure 2:
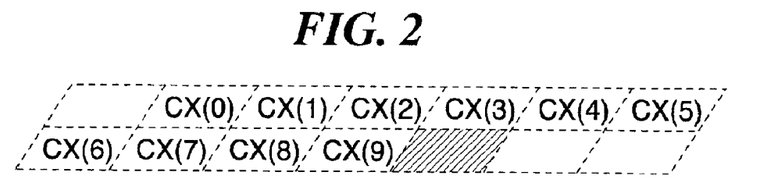
FIG. 2 is a diagram useful in explaining how to determine a CX for processing binary image data by the FIG. 1 arithmetic decoding device.

FIG. 2 shows how to determine a CX for processing binary image data. In the figure, the hatched block designates a pixel to be decoded.

Also referring to FIG. 1, the mode-designating signal 150 notifies the CX-generating section 100, the predicted state value select signal-generating section 140, the MPS/LSZ select signal-generating section 141, the predicted state update section 107, and the ROM 110 that the 1-bit mode has been selected. The four divisional portions of the whole set of pairs of MPS's and ST's for the 1-bit mode, which are prepared for respective cases in which a CX(8) and a CX(9), both referred to hereinafter, of the CX value are 00, 01, 10, 11, are read from the ROM 110 and stored in respective first quarters, i.e. 256 addresses of the predicted state memories 181 to 184.

Let it be assumed that in a certain cycle, the CX-generating section 100 has generated and outputted a context (CX) including components (binary values corresponding to the respective pixels): a CX(0) to a CX(7) shown in FIG. 2. More specifically, in the 1-bit mode, the CX-generating section 100 generates and outputs a CX 101 in timing in which respective pixels corresponding to the CX(8) and the CX(9) have not been decoded yet, and hence the value of the CX cannot be determined. In this case, the finally-determined CX can assume four different values depending on the values of the CX(8) and the CX(9), but the CX(8) and CX(9) of the CX 101 outputted are each provisionally fixedly set to "0". Each of the first to fourth predicted state memories 181 to 184 is supplied with the same CX 101 having its CX(8) and CX(9) each set to 0. However, pairs of MP'S and ST's corresponding to respective cases in which the CX(8) and CX(9) of the CX value are 00, 01, 10, 11, are stored in advance in the first to fourth predicted state memories 181 to 184 at respective storage locations having an identical address. Therefore, in the 1-bit mode, in each of the first to fourth predicted state memories 181 to 184, only one-fourth of the memory area is actually used. The above-mentioned cycle will be referred to as the first cycle for convenience of description.

In the following cycle, i.e. a second cycle, the first to fourth predicted state memories 181 to 184 simultaneously output respective pairs of the MPS's 185 to 188 and the ST's 189 to 192, which correspond to the respective four possible values of the CX, from respective storage locations having an identical address indicated by the CX 101. Further, in this cycle, the value of the pixel corresponding to the CX(8) is decoded by the arithmetic operation section 106, and the decoded data 170 is supplied to the first and second selectors 111, 112 as the select signal 142 via the predicted state value select signal-generating section 140. The MPS 113, ST 115 and the MPS 114, ST 116 selected and delivered from the first selector 111 and the second selector 112, respectively, are latched by the first F/F circuit 121 and the second F/F circuit 122, respectively, during the following cycle, i.e. a third cycle.

In the third cycle, the ST 125 delivered from the first F/F circuit 121 is converted to the corresponding LSZ 133 by the first ST/LSZ converting section 131, while the ST 126 delivered from the second F/F circuit 122 is converted to the corresponding LSZ 134 by the second ST/LSZ converting section 132.

Further, in this cycle, the value of the pixel corresponding to the CX(9) in FIG. 2 is decoded by the arithmetic operation section 106, and the decoded data 170 is supplied to the third selector 105 as the select signal 143 via the MPS/LSZ select signal-generating section 141. The MPS 135 and LSZ 136 delivered from the third selector 105 in response to the select signal 143 is inputted to the arithmetic operation section 106.

The MPS 135 and LSZ 136 inputted to the arithmetic operation section 106 in the third cycle are used for arithmetic operation in a fourth cycle, and decoded data of the pixel corresponding to the hatched block in FIG. 2 is outputted from the arithmetic operation section 106. In other words, in the fourth cycle, the arithmetic operation section 106 executes a decoding process based on the MPS 135 and LSZ 136 and outputs the bit of interest on a first bitplane as the decoded data 170.

A pixel of interest is thus decoded according to the flow of processing described above. If attention is paid to each processing block, in a cycle following one in which a pixel of interest was processed, a pixel immediately following the processed pixel of interest is processed.

As described above, in the 1-bit mode, MPS's and ST's are read out in parallel from the four predicted state memories 181 to 184, and further, ST to LSZ conversion and arithmetic operation are performed simultaneously in a pipelined manner as described above, to thereby achieve high-speed decoding.

(In 4-Bit Mode)

FIGS. 3A, 3B and 3C, 3D illustrate how to determine a CX in the 4-bit mode, i.e. for processing image data having 4-bit depth.

Figure 3A:
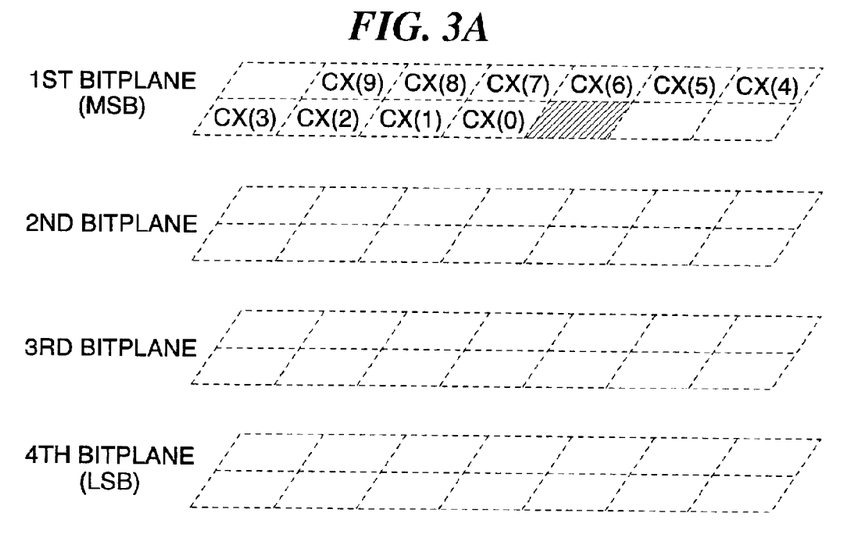
FIG. 3A shows how to determine a CX for a bit of interest on a first bitplane.
Figure 3B:
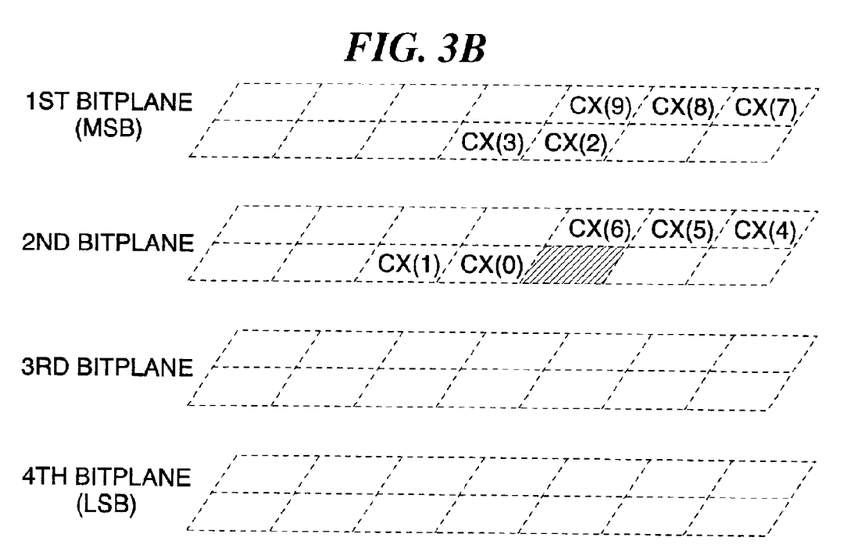
FIG. 3B shows how to determine a CX for a bit of interest on a second bitplane.

FIG. 3A illustrates how to determine a CX for a bit of interest on a first bitplane. In this case, bits on the identical or first bitplane containing the bit of interest are referred to. FIG. 3B illustrates how to determine a CX for a bit of interest on a second bitplane. In this case, bits on the second bitplane containing the bit of interest as well as ones on the first bitplane which is of higher-order than the second bitplane are referred to.

Figure 3C:
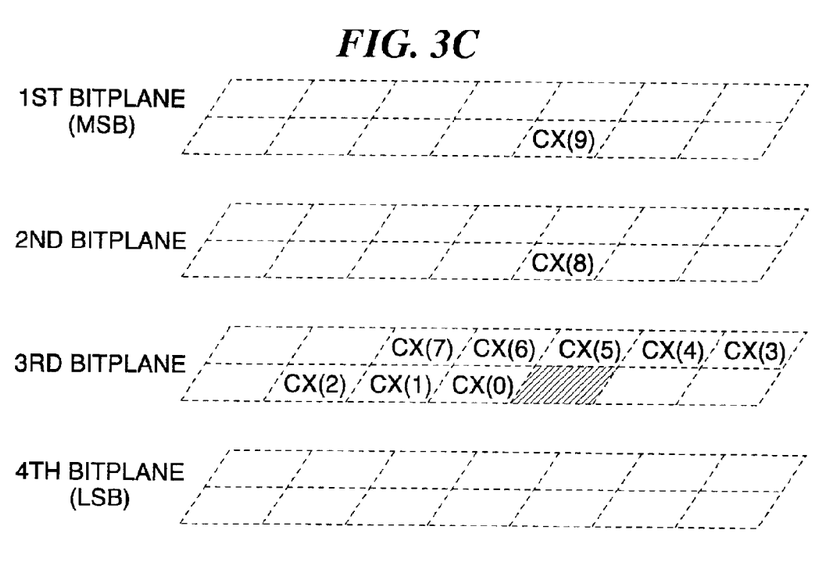
FIG. 3C shows how to determine a CX for a bit of interest on a third bitplane.
Figure 3D:
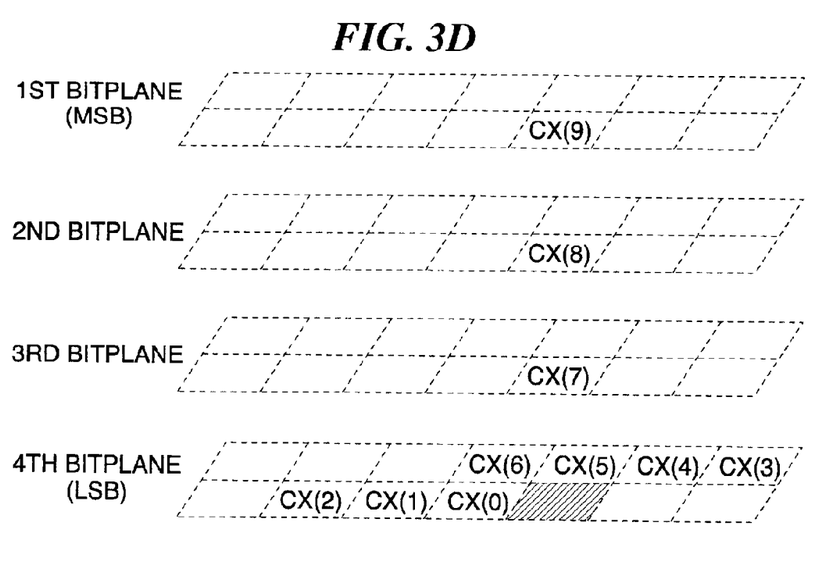
FIG. 3D shows how to determine a CX for a bit of interest on a fourth bitplane.

FIG. 3C illustrates how to determine a CX for a bit of interest on a third bitplane. In this case, bits on the identical or third bitplane containing the bit of interest as well as ones on the first and second bitplanes which are of higher-order than the third bitplane are referred to. FIG. 3D illustrates how to determine a CX for a bit of interest on a fourth bitplane. In this case, bits on the fourth bitplane containing the bit of interest as well as ones on the first, second and third bitplanes which are of higher-order than the fourth bitplane are referred to.

Thus, only bits on the bitplanes of higher-order bits (besides bits on the bitplane containing the bit of interest) are referred to because in a multi-level image, more significant bits have high correlations with less significant bits.

Figure 4:
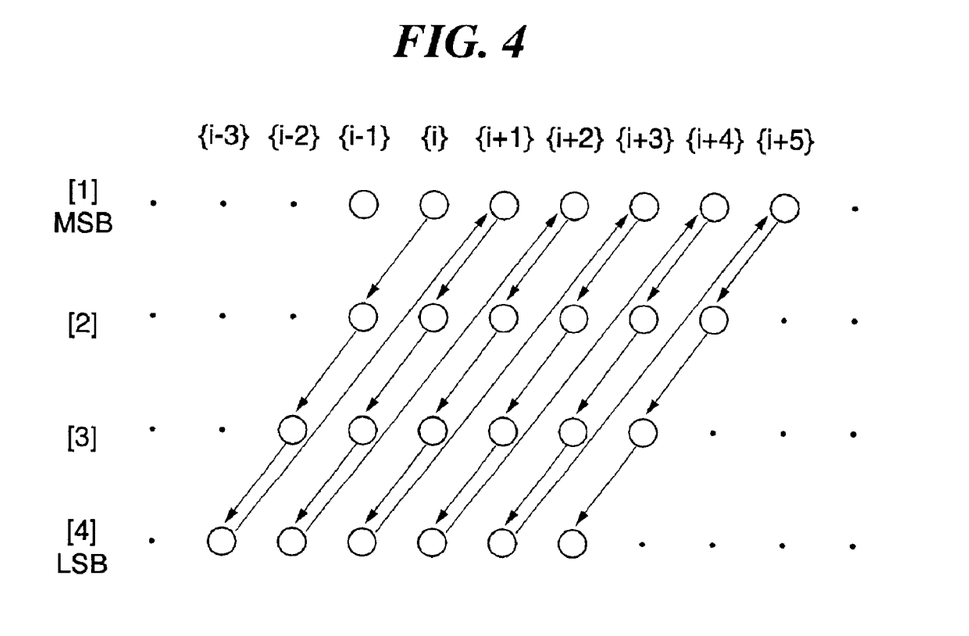
FIG. 4 is a diagram useful in explaining a sequence of decoding the image data in FIGS. 3C, 3D.

FIG. 4 shows an order of bits for arithmetic decoding. In order that the bits can be decoded in the order shown in FIG. 4, it is required that the arithmetic coded data 160 has also been arithmetically decoded in the FIG. 4 order. The decoding of bits in the FIG. 4 order is advantageous in that a bit on the first bitplane which was determined most recently of the CX components for a bit of interest on any one of the second to fourth bitplanes, was already determined to be decoded at least five cycles before. Therefore, at a time point the CX-generating section 100 in FIG. 1 generates a CX for a bit of interest, a bit on the first bitplane which was most recently decoded, has already been determined, and hence the CX(0) to the CX(9) in FIG. 2 have all been determined.

Next, a description will be given of operations for decoding image data in the 4-bit mode.

Referring again to FIG. 1, the mode-designating signal 150 notifies the CX-generating section 100, the predicted state value select signal-generating section 140, the MPS/LSZ select signal-generating section 141, the predicted state update section 107, and the ROM 110 that the 4-bit mode has been selected. The four sets of 1024 pairs of MPS's and ST's for the 4-bit mode which are prepared for the respective four bitplanes are read from the ROM 110, and stored in the predicted state memories 181 to 184, respectively.

Let it be assumed that in a certain cycle, the CX-generating section 100 outputs a CX for a bit of interest at a bit position of $\{i\}$, [1] in FIG. 4. The CX components have all been determined as described above. This cycle will be referred to as the first cycle for convenience of description.

In the following cycle, i.e. a second cycle, the first to fourth predicted state memories 181 to 184 simultaneously output respective pairs of data (MPS and ST) from storage locations having an identical address indicated by the CX 101. In this mode, however, a pair of MPS and ST corresponding to a first bitplane are stored in advance in the corresponding address of the first predicted state memory 181. Similarly, a pair of MPS and ST corresponding to a second bitplane are stored in advance in the corresponding address of the second predicted state memory 182, and a pair of MPS and ST corresponding to a third bitplane are stored in advance in the corresponding address of the third predicted state memory 183. Further, a pair of MPS and ST corresponding to a fourth bitplane are stored in advance in the corresponding address of the fourth predicted state memory 184. In short, during readout in this cycle, only the MPS 185 and ST 189 read out from the first predicted state memory 181 are outputted as valid data.

The predicted state value select signal-generating section 140 generates the state value select signal 142 such that the valid data is selected. More specifically, the first selector 111 selects the MPS 185, ST 189 and then delivers the selected data to the first F/F circuit 121 as the MPS 113, ST 115.

In a third cycle, the first F/F circuit 121 outputs the data latched as the MPS 113, ST 115 in the immediately preceding cycle, as the MPS 123, ST 125. Data held in the second F/F circuit 122 is invalid. Therefore, in this cycle, the MPS/LSZ select signal-generating section 141 causes the third selector 105 to select the MPS 123 and the LSZ 133 delivered from the first ST/LSZ converting section 131 and output the selected data as the MPS 135, ST 136.

In a fourth cycle, the arithmetic operation section 106 executes a decoding process based on the MPS 135 and LSZ 136 and outputs the bit of interest on the first bitplane as the decoded data 170.

The bit at the bit position of $\{i\}$, [1] in FIG. 4 is thus decoded according to the flow of processing described above. If attention is paid to each processing block, in a cycle following one in which the bit of interest at the bit position of $\{i\}$, [1] was processed, the following bit to be processed at a bit position of $\{i-1\}$, [2] in FIG. 4 is processed. More specifically, the CX-generating section 100 generates the CX for the bit at the bit position of $\{i\}$, [1] in FIG. 4 in the first cycle, a CX for the bit at the bit position of $\{i-1\}$, [2] in the second cycle, a CX for a bit at a bit position of $\{i-2\}$, [3] in the third cycle, a CX for a bit at a bit position of $\{i-3\}$, [4] in the fourth cycle, and a CX for a bit at a bit position of $\{i+1\}$, [1] in a fifth cycle. In the subsequent cycles, the CX-generating section 100 repeatedly carries out a similar operation.

Therefore, if attention is paid to the validity of outputs from the respective predicted state memories, in the second cycle, the output data from the first predicted state memory 181 is valid, in the third cycle, the output data from the second predicted state memory 182 is valid, in the fourth cycle, the output data from the third predicted state memory 183 is valid, in the fifth cycle, the output data from the fourth predicted state memory 184 is valid, and so forth. That is, in the 4-bit mode, the predicted state value select signal-generating section 140 is only required to sequentially change the select signal such that the outputs from the respective predicted state memories 181 to 184 are sequentially and cyclically selected.

If attention is paid to the third selector 105, the selector 105 selects the MPS 123, LSZ 133 corresponding to the output data from the first predicted state memory 181 in the third cycle, the MPS 123, LSZ 133 corresponding to the output data from the second predicted state memory 182 in the fourth cycle, the MPS 124, LSZ 134 corresponding to the output data from the third predicted state memory 183 in the fifth cycle, the MPS 124, LSZ 134 corresponding to the output data from the fourth predicted state memory 184 in a sixth cycle, and so forth. That is, in the 4-bit mode, the MPS/LSZ select signal-generating section 141 is only required to sequentially change the select signal such that the MPS 123, LSZ 133 and the MPS 124, LSZ 134 are alternately selected every other cycle.

As described above, in the 4-bit mode, the four predicted state memories 181 to 184 are assigned to the respective bitplanes.

(In 2-Bit Mode)

Figure 5A:
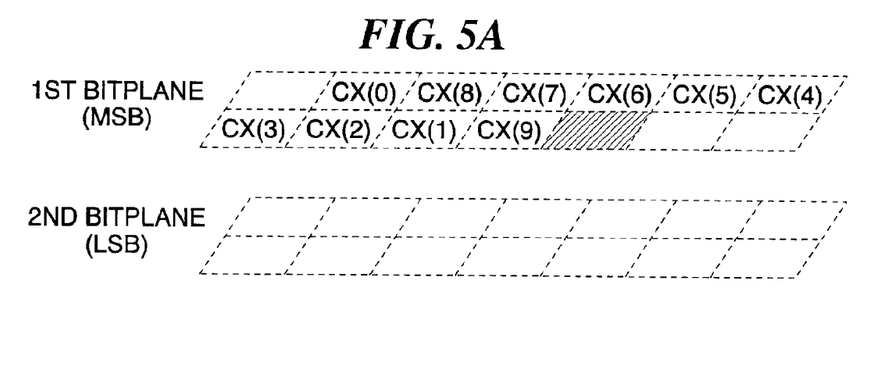
FIG. 5A shows how to determine a CX for a bit of interest on a first bitplane.
Figure 5B:
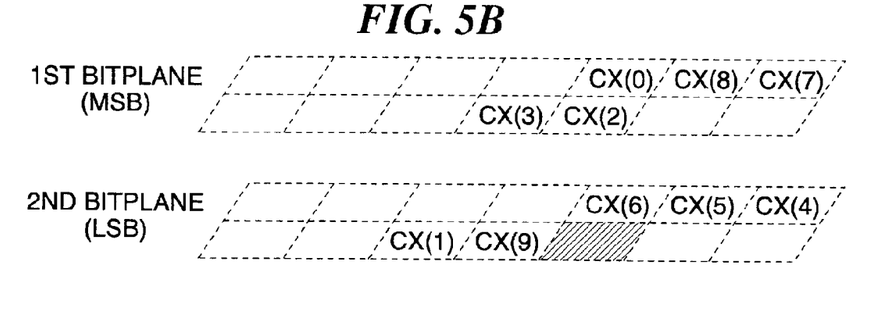
FIG. 5B shows how to determine a CX for a bit of interest on a second bitplane.

FIGS. 5A, 5B illustrate how to determine a CX in a 2-bit mode, i.e. for processing image data having 2-bit depth. FIG. 5A illustrates how to determine a CX for a bit of interest on a first bitplane as the most significant one. In this case, bits on the identical bitplane are referred to. FIG. 5B illustrates how to determine a CX for a bit of interest on a second bitplane. In this case, bits on the second bitplane containing the bit of interest as well as the ones on the first bitplane as the most significant one are referred to.

Thus, only bits on the bitplane of higher order (besides bits on the bitplane containing the bit of interest) are referred to because in a multi-level image, more significant bits have high correlations with less significant bits, as mentioned above.

Figure 6:
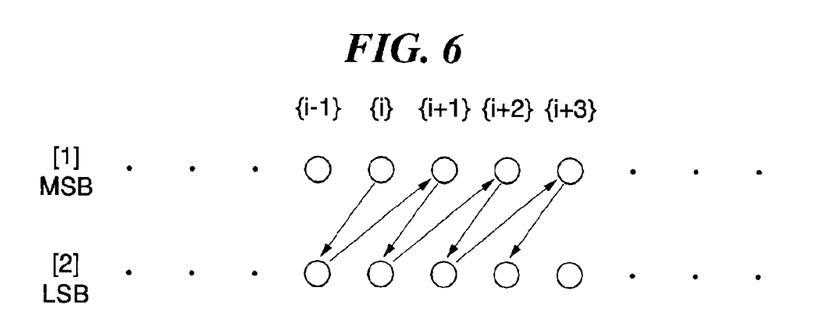
FIG. 6 is a diagram useful in explaining a sequence of decoding the image data in FIGS. 5A, 5B.

FIG. 6 shows an order of bits for arithmetic decoding. In order that the bits can be decoded in the order shown in FIG. 6, it is required that the arithmetic coded data 160 has also been arithmetically encoded in the FIG. 6 order. The decoding of bits in the FIG. 6 order is advantageous in that a bit immediately adjacent to a bit of interest on a bitplane, which was determined most recently of the CX components for the bit of interest, was determined to be decoded two cycles before. Therefore, at a time point the CX-generating section 100 in FIG. 1 generates a CX for a bit of interest, a CX(0) to a CX(8) in each of FIGS. 5A, 5B have all been determined, but only a CX(9) in each of FIGS. 5A and 5B for one bit has not been determined yet.

Let it be assumed that in a certain cycle, the CX-generating section 100 generates and outputs a context (CX) 101 having components (binary values corresponding to the respective pixels): CX(0) to CX(8) for a bit of interest at a bit position of $\{i\}$, [1] on the more significant bitplane in FIG. 6. More specifically, in the 2-bit mode, the CX-generating section 100 generates and outputs a CX 101 in timing in which a pixel corresponding to the CX(9) has not been decoded yet, and hence the value of the CX cannot be determined. In this case, the finally-determined CX can assume two different values depending on the values of the CX(9), but the CX(9) of the CX 101 outputted is provisionally fixedly set to "0". Each of the first to fourth predicted state memories 181 to 184 is supplied with the same CX 101 having its CX(9) set to 0. However, pairs of MP'S and ST's corresponding to the more significant bitplane and at the same time to respective cases in which the CX(9) of the CX value are 0 and 1, are read from the ROM 110 in response to the mode-designating signal 150 and stored in advance in the first and second predicted state memories 181 and 182 at respective storage locations having an identical address, and similarly, pairs of MP'S and ST's corresponding to the less significant bitplane and at the same time to respective cases in which the CX(9) of the CX value are 0 and 1, are read from the ROM 110 in response to the mode-designating signal 150 and stored in advance in the third and fourth predicted state memories 183 and 184 at respective storage locations having an identical address. Therefore, in the 2-bit mode, in each of the first to fourth predicted state memories 181 to 184, only half of the memory area is actually used. The above-mentioned cycle will be referred to as the first cycle for convenience of description.

In the following cycle, i.e. a second cycle, the first to fourth predicted state memories 181 to 184 simultaneously output respective pairs of data (MPS and ST) from storage locations indicated by an identical address indicated by the CX 101. In this cycle, the value of the pixel corresponding to the CX(9) is decoded by the arithmetic operation section 106, and the decoded data 170 is supplied to the first selector 111 as the select signal 142 via the predicted state value select signal-generating section 140. The MPS 113 and ST 115 delivered from the first selector 111 are latched by the first F/F circuit 121 during the following cycle, i.e. a third cycle.

In the third cycle, the ST 125 delivered from the first F/F circuit 121 is converted to the corresponding LSZ 133 by the first ST/LSZ converting section 131. Output data from the second F/F circuit 122 is invalid. Therefore, in this cycle, the MPS/LSZ select signal-generating section 141 causes the third selector 105 to select the MPS 123 and the LSZ 133 delivered from the first ST/LSZ converting section 131 and output the selected data as the MPS 135, ST 136.

In a fourth cycle, the arithmetic operation section 106 executes a decoding process based on the MPS 135 and the LSZ 136 and outputs the bit of interest on the first bitplane as the decoded data 170.

The bit at the bit position of $\{i\}$, [1] in FIG. 6 is thus decoded according to the flow of processing described above. On the other hand, the following bit data to be processed at a bit position of $\{i-1\}$, [2] in FIG. 6 belongs to the less significant bitplane.

A CX 101 having the components CX(0) to CX(8) shown in FIG. 5B is outputted from the CX-generating section 100 in the second cycle.

In the following third cycle, the first to fourth predicted state memories 181 to 184 simultaneously output respective pairs of data (MPS and ST) from storage locations having an identical address indicated by the CX 101. As described above, two possible pairs of MPS's and ST's corresponding to the less significant bitplane are stored in advance in the third predicted state memory 183 and the fourth predicted state memory 184, respectively, in a divided manner. In this cycle, the value of the pixel corresponding to the CX(9) in FIG. 5B is decoded by the arithmetic operation section 106, and the decoded data 170 is supplied to the predicted state value select signal-generating section 140 1 which forms the select signal 142 therefrom and supplies the same to the second selector 112. The MPS 114 and ST 116 delivered from the second selector 112 are latched by the second F/F circuit 122 during the following cycle, i.e. a fourth cycle.

In the fourth cycle, the ST 126 delivered from the second F/F circuit 122 is converted to the corresponding LSZ 134 by the second ST/LSZ converting section 132. Output data from the first F/F circuit 121 is invalid. Therefore, in this cycle, the MPS/LSZ select signal-generating section 141 causes the third selector 105 to select the MPS 124 and the LSZ 134 delivered from the second ST/LSZ converting section 132 and output the selected data as the MPS 135, and the LSZ 136.

In a fifth cycle, the arithmetic operation section 106 executes a decoding process based on the MPS 135 and the LSZ 136 and outputs the bit of interest on the second bitplane as the decoded data 170.

If attention is paid to the third selector 105, the selector 105 selects the MPS 123, LSZ 133 in the third cycle as data corresponding to the more significant bitplane, and the MPS 124, LSZ 134 corresponding to the less significant bitplane in the fourth cycle. That is, in the 2-bit mode, the MPS/LSZ select signal-generating section 141 is only required to sequentially change the select signal such that the MPS 123, LSZ 133 and the MPS 124, LSZ 134 are alternately selected.

It goes without saying that the object of the present invention may be accomplished by installing program codes of software realizing the functions of the arithmetic decoding device of the above described embodiment, from a storage medium in which the program codes are recorded into electronic equipment, such as a FAX machine or a personal computer (PC), and causing a computer (or CPU) of the electronic equipment to execute the program.

In this case, the program codes themselves which are installed in the electronic equipment by using the storage medium achieve the novel functions of the present invention, and the storage medium storing the program codes constitutes the present invention.

The storage medium for recording the program codes may be a floppy disk, a hard disk, an optical memory disk, an magneto-optical disk, a CD-ROM, a CD-R (CD-Recordable), a magnetic tape, a nonvolatile memory card, or a ROM, for instance. Also, the program codes may be supplied from a server computer through a communication network.

It goes without saying that the present invention encompasses a case in which the functions of the illustrated embodiments are accomplished not only by executing the program codes read out by the computer, but also by causing an OS operating on the computer to perform a part or all of actual operations according to the instructions of the program codes.

Further, the present invention also encompasses a case in which the program codes read out from the storage medium are written into a memory provided in an expanded function board inserted in the FAX machine or PC or in an expanded function unit connected thereto, and then the CPU or the like integrated in the expanded function board or expanded function unit actually performs a part of or all of the operations, based on the instructions of the program codes, so as to accomplish the functions of the illustrated embodiment.

What is claimed is:

1. An arithmetic decoding method of decoding arithmetically encoded image data formed of at least one bitplane, by using a single arithmetic operation section and a plurality of memories that can be accessed separately, comprising the steps of:
receiving information on a bit depth of the arithmetically encoded image data;
storing, when the bit depth of the arithmetically encoded image data is equal to a number of the memories, state variables corresponding to pixels to be decoded, of respective bitplanes of the image data in respective corresponding ones of the memories;
storing, when the bit depth of the arithmetically encoded image data is less than the number of the memories, one of the state variables corresponding to pixels to be decoded, of each bitplane of the image data, in at least part of the memories by allocating the one of the state variables thereto;
reading ones of the state variables corresponding, respectively, to pixels to be decoded, of each bitplane, from the memories;
selecting ones of the state variables read from the memories based on data which have been arithmetically encoded by the arithmetic operation section; and
inputting the selected ones of the state variables and values of a more probable symbol which are paired with the selected ones of the state variables, to the arithmetic operation section.

2. An arithmetic decoding method according to claim 1, wherein the probable symbol values are stored together with the selected ones of the state variables paired therewith in the memories according to the information on the bit depth of the image data.

3. An arithmetic decoding method according to claim 1, wherein said reading step comprises reading and holding ones of the state variables that can actually correspond to each pixel to be decoded, from the memories, before which of the ones of the state variables actually correspond to the pixel is known, when the bit depth of the image data is an even number and is equal to half of a number of the memories; and
said selecting stop comprises selecting one of the ones of the state variables read from the memories and held, which is known to actually correspond to the pixel.

4. An arithmetic decoding method according to claim 1, further comprising the steps of:
storing the decoded image data per pixel in a buffer memory; and
generating a context from the image data stored in the buffer memory according to the information on the bit depth of the image data.

5. An arithmetic decoding method according to claim 1, wherein the state variables comprise one of a state value and a probability estimate.

6. An arithmetic decoding device for decoding arithmetically encoded image data formed of at least one bitplane, comprising:
a single arithmetic operating section that carries out an arithmetic operation;
a plurality of memories that can be accessed separately;
a bit mode input section that inputs information on a bit depth of the arithmetically encoded image data;
a storage control section that stores, when the information input by said bit mode input section indicates that the bit depth of the arithmetically encoded image data is equal to a number of the memories, state variables corresponding to pixels to be decoded, of respective bitplanes of the image data in respective corresponding ones of said memories, and stores, when the information input by said bit mode input section indicates that the bit depth of the arithmetically encoded image data is less than the number of said memories, one of the state variables corresponding to pixels to be decoded, of each bitplane of the image data, in at least part of said memories by allocating the one of the state variables thereto;

a reading section that reads ones of the state variables corresponding, respectively, to pixels to be decoded, of each bitplane, from said memories;

a selecting section that selects ones of the state variables read from said memories based on data which have been arithmetically encoded by said arithmetic operation section; and input section that the selected ones of the state variables and values of a more probable symbol which are paired with the selected ones of the state variables, to said arithmetic operation section.

7. An arithmetic decoding device according to claim 6, wherein the probable symbol values stored together with selected ones of the state variables paired therewith in said memories according to the information on the bit depth of the image data.

8. An arithmetic decoding device according to claim 6, wherein said reading section reads and holds ones of the state variables that can actually correspond to each pixel to be decoded, from said memories, before which of the ones of the state variables actually corresponds to the pixel is known, when the bit depth of the image data is an even number and is equal to half of a number of said memories; and said selecting section selects one of the ones of the state variables read from said memories and held, which is known to actually correspond to the pixel.

9. An arithmetic decoding device according to claim 6, further comprising:

a buffer memory that stores the decoded image data per pixel; and a context generating section that generates a context from the image data stored in said buffer memory according to the bit depth of the image data.

10. An arithmetic decoding device according to claim 6, wherein the state variables comprise one of a state value and, a probability estimate.

11. A computer-readable medium storing a program for causing a computer to execute an arithmetic decoding method of decoding arithmetically encoded image data formed of at least one bitplane, by using a single arithmetic operation section and a plurality of memories that can be accessed separately, the program comprising:

a receiving module for receiving information on a bit depth of the arithmetically encoded image data;

a storage module for storing, when the bit depth of the arithmetically encoded image data is equal to a number of the memories, state variables corresponding to pixels to be decoded, of respective bitplanes of the image data in respective corresponding ones of the memories, and for storing, when the bit depth of the arithmetically encoded image data is less than the number of the memories, one of the stale variables corresponding to pixels to be decoded, of each bitplane of the image data, in at least part of the memories by allocating the one of the state variables thereto;

a reading module for reading ones of the state variables corresponding, respectively, to pixels to be decoded, of each bitplane, from the memories;

a selection module for selecting ones of the state variables read from the memories based on data which have been arithmetically encoded by the arithmetic operation section; and an input module for inputting the selected ones of the state variables and values of a more probable symbol which are paired with the selected ones of the state variables, to the arithmetic operation section.

12. An arithmetic decoding method of decoding arithmetically encoded binary image data and multi-level image data, by controlling a single arithmetic operation section commonly usable for processing both the binary image data and the multi-level image data, and a plurality of memories for storing sets of state variables including a more probable symbol used for an arithmetic operation by the arithmetic operation section, the arithmetic decoding method comprising the steps of:

receiving the arithmetically encoded image data and information on a bit depth of the arithmetically encoded image data;

controlling selection of storing sets of the state variables, each set corresponding to pixels to be decoded, of one bitplane of the image data, in respective ones of the memories in association with respective bitplanes of the image data, or storing a set of the state variables corresponding to pixels to be decoded, of each bitplane of the image data in at least part of the memories by allocating the set of the state variables thereto, according to the information on the bit depth different numbers of bits; and inputting the sets or set of the state variables stored in the memories or the at least part thereof, in an order determined according to the bit depth of the image data, to the arithmetic operation section.

13. An arithmetic decoding method according to claim 12, further comprising a selection step of selecting at least one valid set of state variables from the sets or set of the state variables stored in the memories or the at least part thereof, according to the bit depth of the image data.

* * * * *